United States Patent
Okuya et al.

(10) Patent No.: US 9,403,720 B2
(45) Date of Patent: Aug. 2, 2016

(54) POROUS CERAMIC AND METHOD FOR PRODUCING SAME

(71) Applicant: KOMATSU SEIREN CO., LTD., Nomi, Ishikawa (JP)

(72) Inventors: Teruhiro Okuya, Nomi (JP); Yutaka Hayashi, Nomi (JP); Kohsuke Togashi, Nomi (JP); Akihisa Kaneda, Nomi (JP); Takeshi Ohta, Nomi (JP)

(73) Assignee: KOMATSU SEIREN CO., LTD., Nomi, Ishikawa (JP)

( * ) Notice: Subject to any disclaimer, the term of this patent is extended or adjusted under 35 U.S.C. 154(b) by 0 days.

(21) Appl. No.: 14/356,884

(22) PCT Filed: Nov. 30, 2012

(86) PCT No.: PCT/JP2012/081108
§ 371 (c)(1),
(2) Date: May 7, 2014

(87) PCT Pub. No.: WO2013/081115
PCT Pub. Date: Jun. 6, 2013

(65) Prior Publication Data
US 2014/0302979 A1    Oct. 9, 2014

(30) Foreign Application Priority Data
Nov. 30, 2011  (JP) .................. 2011-262017

(51) Int. Cl.
| | |
|---|---|
| *C04B 33/04* | (2006.01) |
| *C04B 38/10* | (2006.01) |
| *C04B 38/02* | (2006.01) |
| *C04B 41/91* | (2006.01) |
| *C04B 41/00* | (2006.01) |

(Continued)

(52) U.S. Cl.
CPC ............ *C04B 33/04* (2013.01); *C04B 38/02* (2013.01); *C04B 41/009* (2013.01); *C04B 41/53* (2013.01); *C04B 41/91* (2013.01); *C04B 2111/00284* (2013.01); *C04B 2235/602* (2013.01)

(58) Field of Classification Search
CPC ...... C04B 38/02; C04B 33/32; C04B 33/323; C04B 33/13; C04B 33/132
USPC ....................................... 501/80–85
See application file for complete search history.

(56) References Cited

U.S. PATENT DOCUMENTS 7,658,990 B2 *    2/2010   Shin ...................... 428/313.7

FOREIGN PATENT DOCUMENTS

| JP | 04219378 | * | 9/1992 |
| JP | 05017252 | * | 1/1993 |

(Continued)

OTHER PUBLICATIONS

Machine translation of JP 2003049402, Feb. 2003.*

(Continued)

*Primary Examiner* — Karl Group
(74) *Attorney, Agent, or Firm* — Nixon Peabody LLP; Khaled Shami (57) ABSTRACT

A porous ceramic for which any decrease in water permeability can be suppressed over a long period of time. A porous ceramic is composed of a porous ceramic sintered body produced by molding and sintering a mixture containing a clay, wherein a surface portion of the porous ceramic sintered body has been removed by grinding. The mixture preferably contains a foaming agent.

5 Claims, 2 Drawing Sheets

(51) Int. Cl.
*C04B 41/53* (2006.01)
*C04B 111/00* (2006.01)

(56) References Cited

FOREIGN PATENT DOCUMENTS

| JP | 05017253 | * | 1/1993 |
| JP | A-05-286779 A | | 11/1993 |
| JP | A-2002-330623 A | | 11/2002 |
| JP | 2003049402 A | | 2/2003 |
| WO | WO 2010/106724 A1 | | 9/2010 |

OTHER PUBLICATIONS

International Search Report of PCT/JP2012/081108, mailing date Mar. 12, 2013.
Notice of Reasons for Rejection, dated Apr. 26, 2016, issued in Japanese Patent Application No. 2013-547238, 7 pages.

* cited by examiner

POROUS CERAMIC AND METHOD FOR PRODUCING SAME

CROSS-REFERENCE TO RELATED PATENT APPLICATION

This application is the national stage of International Application No. PCT/JP2012/081108, filed Nov. 30, 2012, entitled, "Porous Ceramic And Method For Producing Same," which claims the benefit of priority of Japanese Patent Application No. 2011-262017, filed Nov. 30, 2011, the contents of which are incorporated herein by reference in their entirety.

TECHNICAL FIELD

The present invention relates to a porous ceramic and a method for producing the same.

BACKGROUND ART

Porous ceramics are generally used for fire-resistant insulating materials, water purification materials, humidity conditioning materials, and volatile organic compound (VOC) adsorption materials and the like. The structure of these types of porous ceramics include closed cell-type structures, lattice structures, aggregate-type structures, structures having pores formed from very fine cracks, and structures having continuous interconnected pores, and these may be selected in accordance with the application.

Examples of known lattice structure porous ceramics include structures produced by injecting a ceramic composition into the pores of a foamed urethane resin, subsequently decomposing the resin component, and then performing sintering.

Examples of known aggregate-type porous ceramics include structures in which the spaces between an aggregate of coarse particles in a composition function as pores.

Examples of known closed cell-type porous ceramics include structures in which pores are generated during a firing process by high-temperature decomposition of volatile components within the composition.

Examples of known porous ceramic having pores formed from very fine cracks include structures obtained by sintering a composition obtained by mixing a raw material such as a clay which contracts upon heating and a slag which expands upon heating.

Further, examples of known porous ceramics having continuous interconnected pores include structures obtained by adding an alkaline solution to metallic aluminum within a water-containing composition to generate hydrogen, and then performing sintering.

In recent years, porous ceramics have also started to be used as road surface materials for paved roads, roofing materials and wall materials for buildings, and building materials for greening base materials and the like. Porous ceramics used as building materials must be readily permeable to water (have high water permeability), and also have appropriate water retention properties.

One example of this type of porous ceramic that has been proposed is a porous ceramic sintered body produced by mixing a diatomaceous earth, a clay and an organic sludge, and then sintering the mixture (for example, see Patent Document 1). According to the invention of Patent Document 1, the combination of micrometer order pores which are derived from retained pores of the diatomaceous earth by preventing the clay from entering the pores of the diatomaceous earth, and millimeter order pores which are formed artificially enables both the water permeability and the water retention properties to be enhanced.

DOCUMENTS OF RELATED ART

Patent Documents

Patent Document 1: International Patent Application, No. 2010/106724

SUMMARY OF THE INVENTION

Problems to be Solved by the Invention

However, if conventional porous ceramics are used without modification as building materials, then a problem arises in that the water permeability tends to decrease over time. It is thought that the reason for this lowering of the water permeability is that microparticles of sand and dust and the like tend to block the pores at the surface of the porous ceramic, and removing such microparticles from road surface materials, roof materials and wall materials used in the open air, and from greening base materials used for burying in soil has proven difficult.

Accordingly, an object of the present invention is to provide a porous ceramic for which any decrease in water permeability can be suppressed over a long period of time.

Means to Solve the Problems

One aspect of the porous ceramic of the present invention is produced by molding and sintering a mixture containing a clay to obtain a porous ceramic sintered body, and then subjecting a surface of the porous ceramic sintered body to grinding. In other words, one aspect of the porous ceramic of the present invention is composed of a porous ceramic sintered body produced by molding and sintering a mixture containing a clay, wherein a surface portion of the porous ceramic sintered body has been removed by grinding. The mixture preferably contains a foaming agent.

One aspect of a method for producing a porous ceramic according to the present invention includes molding and sintering a mixture containing a clay to obtain a porous ceramic sintered body, and subjecting the surface of the porous ceramic sintered body to grinding. The mixture preferably contains a foaming agent.

Effects of the Invention

According to the porous ceramic of the present invention, any decrease in water permeability can be suppressed over a long period of time.

EMBODIMENTS FOR CARRYING OUT THE INVENTION

Porous Ceramic

One aspect of the porous ceramic of the present invention is produced by molding and sintering a mixture containing a clay to obtain a porous ceramic sintered body, and subjecting a surface of the porous ceramic sintered body to grinding.

The porous ceramic is a material having internal pores formed therein.

The size of the pores formed in the porous ceramic can be determined with due consideration of the application, and may be nanometer order pores having a pore size of 10 to 1,000 nm, micrometer order pores having a pore size exceeding 1 μm but not more than 1,000 μm, millimeter order pores having a pore size exceeding 1 mm but not more than 300 mm, or a mixture of these pores. The pore size of a pore refers to the length of the pore in the lengthwise direction, and in the following description, the simplified expression "pore size" indicates the length of the major axis of the pore. The pore size of the pores can be adjusted by appropriate combination of the types of raw materials used and the firing conditions. The pore size of millimeter order pores refers to a value obtained by cutting the porous ceramic and measuring the pores using a scale. The pore sizes of nanometer order pores and micrometer order pores refer to values obtained by cutting the porous ceramic and measuring the pores using an electron microscope.

The pores formed in the porous ceramic may be independent closed cells, or continuous pores that are mutually interconnected. From the viewpoints of improving the thermal insulation, the sound absorbency, the water retention and the breathability, the porous ceramic preferably has continuous pores. It is particularly preferable that these continuous pores are formed so as to penetrate right through the porous ceramic.

The percentage volume of the pores within the porous ceramic (porosity) is determined in accordance with the intended application, and for example, the porosity represented by [(volume of pores)/(volume of porous ceramic)]×100, is preferably from 20 to 85% by volume, more preferably from 40 to 80% by volume, and still more preferably from 60 to 70% by volume. Provided the porosity is at least as large as the above lower limit, various properties such as the water permeability, the water retention, the soundproofing properties and the thermal insulation can be enhanced, and provided the porosity is not more than the upper limit, the strength of the porous ceramic can be improved.

The saturated water content of the porous ceramic is, for example, preferably at least 20%, more preferably 30% or greater, and still more preferably 40% or greater. A higher upper limit is preferable, but if the saturated water content is too high, then the strength of the porous ceramic may be insufficient in some applications, and therefore the upper limit is preferably not more than 100%, and more preferably 80% or less. If the saturated water content is less than 20%, then even if the porosity is high, the water retention tends to decrease, and there is a possibility that satisfactory effects may not be obtainable in applications such as greening base materials, or applications (such as road surface materials, ceiling materials and wall materials) targeting a cooling effect produced by the volatilization of retained water (thereby suppressing temperature increases).

The specific gravity of the porous ceramic, represented by [mass of porous ceramic in dry state (g)]/[volume of porous ceramic $(cm^3)$], is preferably from 0.4 to 1.3 $g/cm^3$, more preferably from 0.45 to 1.1 $g/cm^3$, and still more preferably from 0.55 to 0.85 $g/cm^3$. Provided the specific gravity is at least as large as the above lower limit, the strength of the porous ceramic can be enhanced, and provided the specific gravity is not more than the upper limit, various properties of the porous ceramic can be improved.

The shape of the porous ceramic can be determined with due consideration of the intended application and the like, and possible shapes include flat plate shapes, and columnar shapes such as circular cylindrical shapes and prismatic shapes (block shapes). Of these, the effects of the present invention are particularly marked in flat plate shapes and prismatic shapes, which are ideal for road surface materials, and building materials such as ceiling materials and wall materials.

The size of the porous ceramic can be determined with due consideration of the intended application and the like, and for example, in the case of a flat plate shape, the porous ceramic typically has dimensions of length: 5 to 100 cm×width: 5 to 100 cm×thickness: 1 to 10 cm.

(Production Method)

One aspect of a method for producing the porous ceramic according to the present invention includes a step of obtaining a mixture containing a clay (mixing step), a step of molding the mixture to obtain a molded body (molding step), a step of sintering the molded body to obtain a porous ceramic sintered body (firing step), and a step of subjecting a surface of the porous ceramic sintered body to grinding (grinding step).

<Mixing Step>

The mixing step is a step of mixing a clay and any other optional components as required to obtain a mixture.

<<Clay>>

Clay is a mineral material that exhibits clay-like properties, and is widely used as a ceramic raw material. However, the clay used in this aspect of the present invention does not contain diatomaceous earth.

The clay may use known clays used in conventional ceramic sintered bodies, and is typically composed of a mineral composition containing quartz, feldspar and clay-based minerals, wherein the constituent minerals are preferably mainly kaolinite, but also include halloysite, montmorillonite and illite. Among such clays, from the viewpoints of suppressing crack development during sintering, and preventing damage to the porous ceramic, the clay preferably includes coarse particles of quartz having a particle size of 500 μm or greater. Further, these coarse particles of quartz preferably have a particle size of 5 mm or less. Examples of this type of clay include gairome clay and the like. A single type of clay may be added, or an appropriate combination of two or more types may be added.

The blend amount of the clay within the mixture is determined as appropriate, with due consideration of factors such as the intended application of the porous ceramic, and is, for example, preferably from 5 to 60% by mass, and more preferably from 10 to 50% by mass. If the blend amount is less than the above lower limit, then there is a possibility that the porous ceramic may become brittle, whereas if the blend amount exceeds the upper limit, there is a possibility that the moldability may deteriorate.

<<Optional Components>>

Examples of the optional components include foaming agents, organic sludge, diatomaceous earth, fillers and various other additives, and of these, foaming agents and organic sludge are preferable, and foaming agents are particularly desirable. By using a foaming agent and an organic sludge as optional components, the porosity of the porous ceramic can be increased, meaning various properties of the porous ceramic can manifest more readily.

The foaming agent is a substance which foams during firing, and conventional foaming agents for ceramics, such as calcium carbonate, silicon carbide, magnesium carbonate and slags, can be used. Among these foaming agents, a slag is preferable.

There are no particular limitations on the slag, and examples include glass-like slags such as a blast furnace slag generated during metal refining, a municipal waste molten slag generated during melting of municipal waste, a sewage sludge molten slag generated during melting of sewage sludge, and a cast iron slag generated during casting of ductile cast iron or the like. Among these, a cast iron slag is particularly preferable. A cast iron slag tends to have a stable composition, meaning a stable foamed state can be obtained, and also has a foaming rate that is approximately 1.5 to 2 times that of other slags. By using a cast iron slag, large millimeter order pores can be formed in the porous ceramic.

The blend amount of the foaming agent within the mixture can be determined as appropriate, with due consideration of factors such as the intended application of the porous ceramic, and is, for example, preferably from 10 to 80% by mass, and more preferably from 30 to 70% by mass. If the blend amount is less than the above lower limit, then the porosity falls too low, and there is a possibility that various properties of the porous ceramic may not manifest satisfactorily, whereas if the blend amount exceeds the upper limit, there is a possibility that the moldability may deteriorate.

The organic sludge is a sludge containing organic matter as the main component. By using an organic sludge, nanometer order through to micrometer order pores are formed in the porous ceramic. Although there are no particular limitations on the organic sludge, an activated sludge derived from sewage or wastewater treatment from a factory or the like is particularly preferable. An activated sludge is discharged from a wastewater treatment facility using an activated sludge method, and passes through a flocculation step and a dewatering step. By using this type of organic sludge, pores of the desired size can be formed with ease. Moreover, an activated sludge derived from a wastewater treatment, which has typically been considered a waste product, can be recycled as a raw material.

The water content of the organic sludge is preferably from 60 to 90% by mass, and more preferably from 65 to 85% by mass. Provided the water content satisfies the above range, a uniform mixture can be obtained in the mixing step, and favorable moldability can also be maintained during continuous molding.

There are no particular limitations on the amount of organic matter within the organic sludge, and for example, the amount of organic matter (the organic matter content) within the solid fraction of the organic sludge is preferably 70% by mass or greater, and more preferably 80% by mass or greater. The upper limit for the amount of organic matter within the solid fraction of the organic sludge may be 100% by mass. The larger the organic matter content, the more easily pores can be formed. The organic matter content is a value obtained by measuring the ash content (% by mass) of the dried sludge at a carbonization temperature of 700° C. in accordance with JIS M 8812-1993, and is calculated using formula (1) shown below.

$$\text{Organic matter content (\% by mass)}=100(\% \text{ by mass})-\text{ash content (\% by mass)} \quad (1)$$

The blend amount of the organic sludge within the mixture can be determined as appropriate, with due consideration of factors such as the intended application of the porous ceramic, and is, for example, preferably from 1 to 60% by mass, and more preferably from 3 to 40% by mass. Provided the blend amount satisfies this range, the mixture exhibits appropriate fluidity and plasticity, and the moldability can be improved. In addition, continuous pores can be formed more readily, and various properties of the porous ceramic can be enhanced.

Diatomaceous earth is a sediment formed from the remains of diatoms, and is a porous material having micrometer order pores.

There are no particular limitations on the diatomaceous earth, and the same materials as those used conventionally in insulating firebricks and filter media and the like can be used. For example, there is no need to purify the diatomaceous earth by separating clay minerals (such as montmorillonite), quartz or feldspar or the like, and the amount of the diatomaceous earth added to the mixture may simply be adjusted in recognition of the amounts of these materials. Further, the diatomaceous earth may be a material produced by crushing tiles or charcoal stove or the like that have been produced using diatomaceous earth.

There are no particular limitations on the water content of the diatomaceous earth, and for example, the water content in a natural dry state is preferably from 20 to 60% by mass, more preferably from 30 to 50% by mass, and still more preferably from 35 to 45% by mass. Provided the water content satisfies the above range, a mixture having good moldability can be obtained by removing coarse particles within the impurities during mixing, with due recognition of the water content.

The water content describes a value obtained by a weight loss on drying method, by using an infrared aquameter having the specifications described below to dry the sample (200° C., 12 minutes), and then determining the water content from formula (2) shown below.

<Specifications>

Measurement method: weight loss on drying (measurement of mass upon drying under heat)

Minimum value: water content of 0.1% by mass

Measurement range: water content 0.0 to 100% by mass

Drying temperature: 0 to 200° C.

Measurement accuracy: for a sample mass of 5 g or greater, water content ±0.1% by mass Heat source: infrared lamp, 185 W $$\text{Water content (\% by mass)}=[(m_1-m_2)/(m_1-m_0)]\times 100 \quad (2)$$

$m_1$: total mass (g) of mass of container prior to drying and mass of sample prior to drying, $m_2$: total mass (g) of mass of container after drying and mass of sample after drying, $m_0$: mass (g) of container after drying The blend amount of the diatomaceous earth within the mixture can be determined as appropriate, with due consideration of factors such as the porosity desired for the porous ceramic, and is, for example, typically not more than 55% by mass. The blend amount of the diatomaceous earth in the mixture is preferably from 0 to 40 parts by mass, more preferably from 0 to 20 parts by mass, and still more preferably from 0 to 15 parts by mass.

When a molded body of a mixture containing a diatomaceous earth is fired, a volume change occurs at approximately 200° C., and there is a possibility that cracking or surface defects may occur during firing or during cooling following firing. As a result, diatomaceous earth is preferably not added to the mixture. The expression "diatomaceous earth is not added" means that relative to the total mass of the mixture, the blend amount of diatomaceous earth is typically from 0 to 1% by mass, preferably from 0 to 0.1% by mass, and still more preferably from 0 to 0.01% by mass.

Examples of fillers include particles of high-melting point glass having a melting temperature of 900° C. or higher, carbon fiber, and rock wool. For example, when a mixture containing particles of a high-melting point glass as a filler is subjected to sintering, the particles of the high-melting point glass undergo partial melting, with particles of the high-melting point glass then fusing together and functioning as a binder for the clay and the diatomaceous earth and the like, thereby improving the strength of the porous ceramic. Incorporating carbon fiber or rock wool in the porous ceramic can also improve the strength of the porous ceramic.

Among the various fillers, particles of a high-melting point glass are preferable. By using particles of a high-melting point glass, the strength of the porous ceramic can be further improved, and the flexural strength of the porous ceramic can be particularly enhanced.

The high-melting point glass is a glass which has a melting temperature of 900° C. or higher, preferably 1,000° C. or higher, and more preferably 1,200° C. or higher. Provided the melting temperature is at least as high as the above lower limit, the particles of the high-melting point glass undergo partial melting during the firing step described below, with particles of the high-melting point glass fusing together and functioning as a binder for the clay and diatomaceous earth and the like. In addition, a higher melting temperature can improve the strength of the porous ceramic. Further, the melting temperature of the high-melting point glass is preferably not more than 1,800° C., and more preferably 1,600° C. or lower. If the melting point exceeds the above upper limit, then the particles of the high-melting point glass become difficult to melt during the firing step, and there is a possibility that the strength of the porous ceramic may not be able to be improved significantly.

There are no particular limitations on the material of the high-melting point glass, but an alkali-free glass, aluminosilicate glass, borosilicate glass or quartz glass is preferable, and of these, a borosilicate glass is particularly preferable.

If this type of material is used, the strength of the porous ceramic can be satisfactorily increased.

Alkali-free glass is glass that contains essentially no alkali metal elements such as sodium, potassium and lithium. The expression "contains essentially no alkali metal elements" means that the alkali metal element content within the glass composition, calculated as oxides, is not more than 0.1% by mass. The alkali metal element content within the glass composition, calculated as oxides, is preferably from 0 to 0.1% by mass, and more preferably from 0 to 0.01% by mass.

Aluminosilicate glass is an oxide glass containing aluminum and silicon as the main components.

Borosilicate glass is an oxide glass containing boron and silicon as the main components.

Quartz glass is a glass formed from quartz, and refers to a glass having a high purity of silicon oxide.

An example of this type of high-melting point glass is AN100 (product name, an alkali-free borosilicate glass, manufactured by Asahi Glass Co., Ltd.).

High-melting point glass is used in a wide variety of products, including liquid crystal displays such as liquid crystal televisions, panels such as plasma displays, EL cover glass, cover glasses for solid-state imaging devices typified by CCD, glass for optical filters such as band pass filters, glass for glass substrates for chip-on-glass applications, flasks and beakers.

Waste glass discarded from production processes for the above products, or panels recovered from discarded liquid crystal televisions or the like can be used for the aforementioned particles of high-melting point glass.

In the production of the panels for flat panel displays such as liquid crystal televisions, factors such as increases in the size of the panels have lead to the production of large amounts of waste glass. By using this waste glass from panels for flat panel displays as the high-melting point glass particles, the amount of waste can be reduced. Accordingly, from the viewpoint of reducing the environmental impact, it is preferable that waste glass from panels for flat panel displays is used as the high-melting point glass particles. In addition, waste glass from panels for flat panel displays has a very high glass composition purity, and can therefore be used as a high-melting point glass of stable quality without any special purification.

Although there are no particular limitations on the particle size of the particles of high-melting point glass, the particle size is preferably from 0.3 to 5 mm. If the particle size is less than 0.3 mm, then the porosity of the porous ceramic tends to decrease, and the bulk specific gravity tends to increase. A decrease in the porosity can cause a deterioration in various properties, and an increase in the specific gravity can result in a marked increase in the mass of the porous ceramic. If the particle size exceeds 5 mm, then there is a possibility that the moldability in the molding step described below may deteriorate.

From the viewpoints of improving the productivity of the porous ceramic and further increasing the strength, the particle size of the high-melting point glass is preferably greater than 0.6 mm but not more than 1.2 mm.

For the carbon fiber, various forms of carbon fiber can be used, including polyacrylonitrile (PAN)-based, pitch-based, rayon-based or cellulose-based carbon fiber.

The length of the carbon fiber can be determined with due consideration of the shape and the like of the porous ceramic, and in the case of a flat plate-shaped porous ceramic, is preferably from 1 mm to 10 cm, and more preferably from 5 to 25 mm. If the length of the carbon fiber is less than the above lower limit, then there is a possibility that the strength of the porous ceramic may not be able to be improved satisfactorily, whereas if the length exceeds the upper limit, there is a possibility that the productivity may deteriorate or the external appearance of the porous ceramic may be impaired.

The thickness of the carbon fiber can be determined with due consideration of the shape and the like of the porous ceramic, and in the case of a flat plate-shaped porous ceramic, is preferably from 1 to 1,000 µm, and more preferably from 5 to 100 µm. If the thickness of the carbon fiber is less than the above lower limit, then there is a possibility that the strength of the porous ceramic may not be able to be improved satisfactorily, whereas if the thickness exceeds the upper limit, there is a possibility that the productivity may deteriorate or the external appearance of the porous ceramic may be impaired.

Rock wool is an artificial mineral fiber produced by mixing lime or the like with basalt or a steelmaking slag or the like, and then melting the mixture at high temperature.

The length of the rock wool can be determined with due consideration of the shape and the like of the porous ceramic, and in the case of a flat plate-shaped porous ceramic, is preferably from 1 mm to 10 cm, and more preferably from 5 to 25 mm. If the length of the rock wool is less than the above lower limit, then there is a possibility that the strength of the porous ceramic may not be able to be improved satisfactorily, whereas if the length exceeds the upper limit, there is a possibility that the productivity may deteriorate or the external appearance of the porous ceramic may be impaired.

The thickness of the rock wool can be determined with due consideration of the shape and the like of the porous ceramic, and in the case of a flat plate-shaped porous ceramic, is preferably from 1 to 100 µm, and more preferably from 3 to 30 µm. If the thickness of the rock wool is less than the above lower limit, then there is a possibility that the strength of the porous ceramic may not be able to be improved satisfactorily, whereas if the thickness exceeds the upper limit, there is a possibility that the productivity may deteriorate or the external appearance of the porous ceramic may be impaired.

The blend amount of a filler within the mixture is determined as appropriate, with due consideration of the type of filler and the intended application of the porous ceramic, and is, for example, typically from 5 to 35% by mass. If the blend amount is less than the above lower limit, then the effects achieved by adding the filler are more difficult to obtain, whereas if the amount exceeds the upper limit, there is a possibility that the porosity or the saturated water content may decrease, meaning various properties may not manifest satisfactorily. The blend amount of the filler in the mixture can be determined with due consideration of the strength and the like required of the porous ceramic, and for example in the case where particles of a high-melting point glass are used as the filler, the blend amount of the filler is preferably from 10 to 40 parts by mass, and more preferably from 15 to 40 parts by mass, per 100 parts by mass of the combined total of all raw materials other than the filler. If the blend amount is less than the lower limit of the above range, then there is a possibility that the strength of the porous ceramic sintered body may not be able to be improved adequately, whereas if the blend amount exceeds the upper limit, there is a possibility that the moldability may deteriorate.

Further, in the case where carbon fiber is used as the filler, the blend amount of the filler in the mixture is preferably from 0.01 to 20 parts by mass, more preferably from 0.01 to 10 parts by mass, still more preferably from 0.05 to 5 parts by mass, and particularly preferably from 0.1 to 2 parts by mass, per 100 parts by mass of the raw materials. If the blend amount is less than the lower limit of the above range, then there is a possibility that the strength of the porous ceramic sintered body may not be able to be improved adequately, whereas if the blend amount exceeds the upper limit, there is a possibility that the moldability may deteriorate.

Examples of additives include naphthalene-based fluidizers such as Mighty 2000WH (product name, manufactured by Kao Corporation), melamine-based fluidizers such as Melment F-10 (product name, manufactured by Showa Denko K.K.), polycarboxylic acid-based fluidizers such as Darex Super 100 pH (product name, manufactured by Grace Chemicals), antibacterial agents such as silver, copper and zinc, adsorbents such as zeolite and apatite, and metallic aluminum.

Further, when unpleasant odors are generated from the organic sludge, a deodorizer may be added. Examples of the deodorizer include ammonium chloride and zinc chloride. When this type of deodorizer component is used, odorous components such as hydrogen sulfide can be neutralized, enabling effective odor removal.

The blend amount of such additives can be made with due consideration of the effect being targeted by the additive, provided the additive does not impair the objects of the present invention. For example, when ammonium chloride or zinc chloride is used as a deodorizer, the blend amount is typically from 0.05 to 5% by mass relative to the amount of organic sludge, and preferably represents 0.005 to 1% by mass of the mixture.

These optional components may be used individually, or a combination of two or more components may be used.

The composition of the mixture can be determined with due consideration of factors such as the intended application of the porous ceramic, and examples include mixtures of a clay and a diatomaceous earth, mixtures of a clay, and at least one of a foaming agent and an organic sludge, mixtures of a clay, a diatomaceous earth, and at least one of a foaming agent and an organic sludge, and mixtures of the above types of mixtures and a filler.

The water content of the mixture is not particularly limited, but is preferably from 25 to 45% by mass, and more preferably from 25 to 30% by mass. Provided the water content satisfies this range, the mixture exhibits appropriate fluidity and plasticity, and the moldability improves.

There are no particular limitations on the mixing method used in the mixing step, and one example is a method in which the clay and any other optional components required are placed in a mixing device and mixed together.

The order in which each of the raw materials is added is determined as appropriate in accordance with the composition, and the raw materials may, for example, be added to the mixing device in a single batch and mixed. Further, when a diatomaceous earth is added, the diatomaceous earth and the organic sludge may first be mixed, and the clay and any other raw materials then added to the mixing device and mixed.

There are no particular limitations on the mixing device, and conventional mixing devices can be used, including kneaders such as a Mix Muller (manufactured by Sintokogio, Ltd.), as well as a kneader (manufactured by Moriyama Company Ltd.) and a mixer (manufactured by Nitto Kagaku Co., Ltd.).

The mixing time during the mixing step is determined with due consideration of the blend ratio of the raw materials and the like, and is typically set to a mixing time that enables the mixture to adopt a plastic state. For example, the mixing time is typically from 15 to 45 minutes.

The temperature conditions during the mixing step can be determined as appropriate, with due consideration of the blend ratio of the raw materials and the like, and the temperature is typically from 10 to 80° C.

<Molding Step>

The molding step is a step of molding the mixture obtained in the mixing step into an arbitrary shape.

The molding method may be determined as appropriate in accordance with the shape of the porous ceramic, and examples include a method in which a molding apparatus is used to continuously obtain molded bodies of an arbitrary shape, a method in which the mixture is packed into a mold having an arbitrary shape to obtain a molded body, and a method in which the mixture is drawn or rolled, and subsequently cut to an arbitrary shape to obtain a molded body.

The molding apparatus can be determined in accordance with the shape of the required porous ceramic.

For example, when a plate-shaped or prism-shaped porous ceramic is required, a vacuum kneading and molding machine, a flat plate press molding machine or a flat plate extrusion molding machine or the like may be used, and of these, a vacuum kneading and molding machine is preferable. By using a vacuum kneading and molding machine to remove air from the molded body, the formation of pores can be favorably controlled.

The size of the molded body can be determined with due consideration of the desired size for the porous ceramic.

<Firing Step>

The firing step is a step of firing the molded body obtained in the molding step to obtain a porous ceramic sintered body.

The firing step includes, for example, drying the molded body (drying operation), and then firing the dried molded body (firing operation), thereby sintering the clay to obtain a porous ceramic sintered body.

<<Drying Operation>>

There are no particular limitations on the drying operation, and conventional methods may be used. For example, the molded body may be dried naturally, or dried by treatment for an arbitrary time in a hot air drying oven at 50 to 220° C. Although there are no particular limitations on the water content of the dried molded body, the water content is preferably less than 5% by mass, and more preferably less than 1% by mass. The lower limit for the water content of the molded body following drying is not particularly limited, and may be 0% by mass.

<<Firing Operation>>

There are no particular limitations on the method used for the firing operation, and conventional methods may be used. For example, a method may be used in which firing is performed at an arbitrary temperature using a continuous sintering furnace such as a roller hearth kiln or a batch sintering furnace such as a shuttle kiln. Of these, from the viewpoint of productivity, a continuous sintering furnace is preferably used for the firing operation.

In those cases where an organic sludge or the like is added to the mixture, and odors are generated during firing, a deodorizing device may be fitted to the firing apparatus. Examples of the deodorizing device include scrubber deodorizing devices, ozone deodorizing devices and catalytic deodorizing devices which use a photocatalyst or the like.

The firing temperature (end-point temperature) is determined with due consideration of the types of optional components used and the blend ratio of the raw materials and the like.

For example, in the case of a mixture having a composition containing a filler, a diatomaceous earth, a clay, a slag and an organic sludge, the firing temperature is set to conditions under which the filler partially melts, the diatomaceous earth or clay undergoes sintering, the organic matter contained in the organic sludge thermally decomposes and volatilizes resulting in a reduction in mass, and the slag expands. The firing temperature when firing a molded body of the above composition is preferably from 950 to 1,200° C., and more preferably from 1,000 to 1,100° C. The majority of the organic matter starts to decompose at approximately 700° C., and at 950° C., the inherent odors of the organic sludge are eliminated as the odorous components thermally decompose, while the majority of the organic matter within the organic sludge volatilizes resulting in a significant reduction in mass. Further, the majority of the slag expands as a result of crystallization at 800 to 950° C. The mass reduction in the organic matter and the expansion of the slag cause the formation of pores.

In addition, the filler partially melts at temperatures equal to or higher than the melting temperature, with particles of the filler then fusing together or fusing with the diatomaceous earth or clay to function as a binder. As a result of this fusion of filler particles, and the filler functioning as a binder, the structure of the porous ceramic is reinforced, and the strength is improved with good retention of various properties of the porous ceramic.

If the firing temperature exceeds 1,200° C., then there is a possibility that vitrification of the entire structure of the porous ceramic sintered body may proceed, resulting in breakage of the molded body or the blockage of pores during firing.

In the firing operation, in the period before the end-point temperature is reached, moisture is first evaporated from the molded body, the foaming agent begins to foam, and the organic matter of the organic sludge then undergoes thermal decomposition leading to a reduction in mass. During this process, by appropriately adjusting the nature of the temperature increase (the heating curve or temperature gradient) until the end-point temperature is reached, rapid evaporation of the moisture content or rapid volatilization of the organic matter can be suppressed, thereby preventing damage to the molded body.

Further, if rapid cooling is performed after reaching the firing temperature, then there is a possibility that the porous ceramic sintered body may suffer damage such as cracking or disintegration, but by adjusting the temperature gradient during the firing operation, damage during cooling can be prevented.

The firing time can be determined with due consideration of the firing temperature and the water content and the like of the mixture, but the residence time in the state where the firing temperature has been reached is preferably from 4 to 10 minutes, and more preferably from 6.5 to 7.5 minutes. Provided the residence time satisfies this range, sintering of the porous ceramic proceeds favorably with good prevention of damage to the porous ceramic sintered body.

<Grinding Step>

The grinding step is a step of subjecting a surface of the porous ceramic sintered body obtained in the firing step to grinding. By performing this step, any decrease in water permeability of the porous ceramic can be suppressed over a long period of time.

Examples of the method used for performing the grinding step include methods of grinding the surface of the porous ceramic sintered body using a grinder such as the PV series of vertical milling machines (manufactured by Amitec Corporation) or a sandpaper or the like.

The surface(s) subjected to the grinding treatment can be determined with due consideration of the potential application and usage of the porous ceramic.

For example, when a plate-shaped porous ceramic is produced, either one or both surfaces in the thickness direction of the plate-shaped porous ceramic sintered body are preferably subjected to grinding. Plate-shaped porous ceramics are typically used as building materials, and in such cases, the porous ceramic is installed with one of the thickness direction surfaces exposed to the open air. Because the surface that has been subjected to the grinding treatment offers good suppression of any decrease in water permeability over a long period of time, this surface that has been subjected to grinding is positioned exposed to the open air.

The degree of grinding performed is determined with due consideration of the properties and size and the like of the porous ceramic sintered body, and is, for example, typically performed to a depth of approximately 0.5 to 5 mm from the surface of the porous ceramic sintered body. If the degree of grinding is less than the above lower limit, then the effects of the grinding are more difficult to achieve, whereas if the degree of grinding exceeds the above upper limit, then there is a possibility that the strength of the resulting porous ceramic may decrease.

As described above, according to the present invention, by subjecting a surface of a porous ceramic sintered body to grinding, any decrease in water permeability can be suppressed over a long period of time.

The reason that subjecting a surface to grinding can suppress any reduction in the water permeability is unclear, but is thought to include the following. That is, in the firing operation, the surface of the porous ceramic sintered body undergoes a rapid increase in temperature, and it is thought that vitrification and the like can cause closing of some pores, narrowing of the pore size, and an increase in the number of pores not interconnected with internal pores. If this type of porous ceramic sintered body is used as a building material, then it is thought that pores formed on the surface can quickly become blocked by invasive microparticles.

As a result, it is thought that by removing the surface layer which has a structure that is relatively easily blocked by microparticles, the water permeability of the porous ceramic can be better maintained over a long period of time.

EXAMPLES

The present invention is described below in further detail based on a series of examples, but the present invention is in no way limited by the following examples
(Raw Materials Used)
The raw materials used in the examples were as follows.
<Organic Sludge>
An activated sludge discharged by an activated sludge method from the wastewater treatment facility of a dye factory (Komatsu Seiren Co., Ltd.), and subsequently passed through a flocculation step and a dewatering step was used as the organic sludge. The organic matter content (of the solid fraction) of this activated sludge was 83% by mass, and the water content was 85% by mass.
<Clay>
Gairome clay (from Gifu prefecture or Aichi prefecture) was used as the clay.
<Slag>
A cast iron slag was used as a foaming agent. This cast iron slag was a ductile cast iron slag containing $SiO_2$, $Al_2O_3$, CaO, $Fe_2O_3$, FeO, MgO, MnO, $K_2O$ and $Na_2O$ as the main components Example 1

The slag, the organic sludge, the clay and water were mixed together in the composition shown in Table 1 using a Mix Muller (manufactured by Sintokogio, Ltd.), thus obtaining a plastic-state mixture (mixing step).

Subsequently, the thus obtained mixture was extruded and molded using a vacuum kneading and molding machine (De-airing Extrusion and Forming Machine, manufactured by Takahama Industry Co., Ltd.) to obtain a belt-shaped primary molded body having a width of 60 cm and a thickness of 2 cm. This primary molded body was cut across the width at an arbitrary pitch, thus obtaining a substantially rectangular plate-shaped molded body having a thickness of 2 cm (molding step).

The thus obtained molded body was dried (180° C., 0.5 hours) in a hot air dryer, and following reduction of the water content to not more than 1% by mass, a continuous sintering furnace was used to fire the molded body under firing conditions including a firing temperature of 1,050° C., and a residence time at the firing temperature of 7 minutes (firing step). A roller hearth kiln (effective length of sintering oven: total length 15 m, with the sintering oven divided into 10 zones each having a length of 1.5 m) was used as the continuous sintering furnace.

Following firing, the side edges were cut and removed from the four side surfaces of the porous ceramic sintered body to form a porous ceramic sintered body having dimensions of width: 15 cm×length: 15 cm×thickness: 3.5 cm.

The entire surface of one surface in the thickness direction of the obtained porous ceramic sintered body was subjected to grinding with a grinder, thus obtaining a porous ceramic. During the grinding process, grinding was performed down to a depth of 2 mm from the surface.

The specific gravity, the saturated water content and the water permeation rate of the thus obtained porous ceramic were measured. The results are shown in Table 1

Comparative Example 1

With the exception of not subjecting the porous ceramic sintered body to grinding, a porous ceramic was obtained in the same manner as Example 1. The specific gravity, the saturated water content and the water permeation rate of the obtained porous ceramic were measured. The results are shown in Table 1.
(Measurement Methods)
<Specific Gravity>
Using vernier calipers, the length, width and thickness of the porous ceramic of each example were measured, the volume ($cm^3$) was determined, and the mass (g) of the porous ceramic in an absolute dry state was measured. The specific gravity was determined using the formula: [mass (g) of porous ceramic in an absolute dry state]/[volume ($cm^3$) of porous ceramic].
<Saturated Water Content>
Following measurement of the specific gravity, the porous ceramic (N=5) was immersed in water for 60 minutes, and with the upper surface facing upward, the porous ceramic was then removed from the water without tilting the surface (in order to prevent water running out of the porous ceramic during tilting), and excess water adhered to the surface of the porous ceramic was wiped away with a cloth. The mass of the porous ceramic was then measured immediately (saturated state mass), and the saturated water content was determined from formula (3) below.

$$\text{Saturated water content (\% by mass)}=[(\text{saturated state mass}-\text{absolute dry state mass})/\text{absolute dry state mass}]\times 100 \quad (3)$$

<Water Permeation Rate>
A Ø50 mm vinyl chloride cylinder was placed upright on the surface of the porous ceramic of each example (on the surface that had been subjected to grinding in the case of Example 1), and the cylinder was secured using a waterproof putty (Bathroom Putty, manufactured by Toyo Matelan Co., Ltd.). The porous ceramic was subsequently immersed in water for 60 minutes, and then removed from the water and placed in a vat. Subsequently, 200 mL of water was poured into the cylinder, and the time taken for the level of the water in the cylinder to fall by 50 mL was measured (initial water permeation time).

Once all of the 200 mL of water inside the cylinder had permeated into the porous ceramic, a clay suspension prepared by suspending 0.01 g of a clay (average particle size: 4 μm) in 100 mL of water was poured into the cylinder, and the porous ceramic was left to stand until all of the clay suspension had permeated into the porous ceramic (degradation treatment). The clay used in this test was of a similar particle size to yellow dust, and the 0.01 g of clay within the region enclosed by the cylinder is equivalent to the amount of yellow dust falling in one year (5 $g/m^2$). In other words, the porous ceramic into which the 100 mL of the clay suspension had permeated is a model for a porous ceramic used outdoors for one year (listed in the table as "equivalent to 1 year elapsed"). Subsequently, 200 mL of fresh water was poured into the cylinder, and the time taken for the level of the water in the cylinder to fall by 50 mL was measured (water permeation time after equivalent of 1 year elapsed).

Subsequently, the operations of performing the degradation treatment, and pouring 200 mL of water into the cylinder and measuring the water permeation time were repeated. Based on the measured water permeation time, the water permeation rate was determined using formula (4) shown below. The results are shown in Table 1.

Water permeation rate (mL/second)=50 mL÷water permeation time (seconds)　　　(4)

TABLE 1

|  |  | Example 1 | Comparative Example 1 |
|---|---|---|---|
| Composition (% by mass) | Slag | 45.9 | 45.9 |
|  | Organic sludge | 10.2 | 10.2 |
|  | Clay | 30.6 | 30.6 |
|  | Water | 13.3 | 13.3 |
| Specific gravity (g/cm³) |  | 0.7 | 0.7 |
| Saturated water content (% by mass) |  | 71.6 | 71.6 |
| Initial (equivalent to 0 years elapsed) | Water permeation time (seconds) | 1 | 6 |
|  | Water permeation rate (mL/second) | 50 | 8.3 |
| Equivalent to 1 year elapsed | Water permeation time (seconds) | 1 | 8 |
|  | Water permeation rate (mL/second) | 50 | 6.3 |
| Equivalent to 2 years elapsed | Water permeation time (seconds) | 1 | 10.2 |
|  | Water permeation rate (mL/second) | 50 | 4.9 |
| Equivalent to 3 years elapsed | Water permeation time (seconds) | 1 | 11 |
|  | Water permeation rate (mL/second) | 50 | 4.5 |
| Equivalent to 4 years elapsed | Water permeation time (seconds) | 1 | 13 |
|  | Water permeation rate (mL/second) | 50 | 3.8 |
| Equivalent to 5 years elapsed | Water permeation time (seconds) | 1.2 | 15 |
|  | Water permeation rate (mL/second) | 41.7 | 3.3 |
| Equivalent to 6 years elapsed | Water permeation time (seconds) | 1.2 | 16 |
|  | Water permeation rate (mL/second) | 41.7 | 3.1 |
| Equivalent to 7 years elapsed | Water permeation time (seconds) | 1.2 | 17 |
|  | Water permeation rate (mL/second) | 41.7 | 2.9 |
| Equivalent to 8 years elapsed | Water permeation time (seconds) | 1.2 | 19 |
|  | Water permeation rate (mL/second) | 41.7 | 2.6 |
| Equivalent to 9 years elapsed | Water permeation time (seconds) | 1.2 | 23 |
|  | Water permeation rate (mL/second) | 41.7 | 2.2 |
| Equivalent to 10 years elapsed | Water permeation time (seconds) | 1.2 | 33 |
|  | Water permeation rate (mL/second) | 41.7 | 1.5 |

Figure 1:
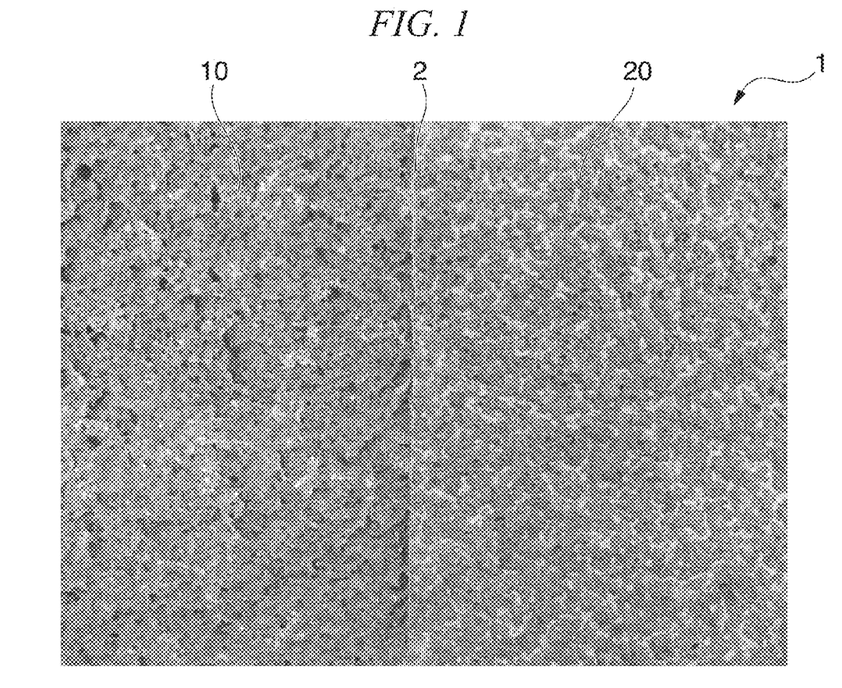
FIG. 1 is a plan view photograph of a porous ceramic.
Figure 2:
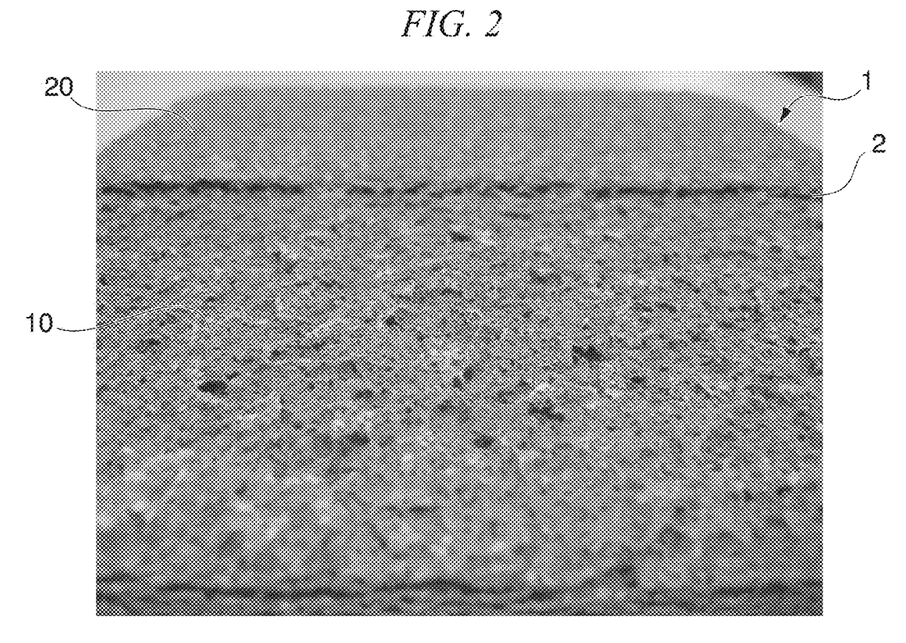
FIG. 2 is a perspective view photograph of a porous ceramic.

FIG. 1 is a plan view photograph of a porous ceramic 1 on which are formed a surface that has been subjected to grinding (ground surface) 10, and a surface that has not been subjected to grinding (non-ground surface) 20, and FIG. 2 is a perspective view photograph of the porous ceramic 1. In FIG. 1 and FIG. 2, numeral 2 indicates the boundary between the ground surface 10 and the non-ground surface 20.

As illustrated in FIG. 1 and FIG. 2, the ground surface 10 has larger unevenness compared with the non-ground surface 20.

Figure 3:
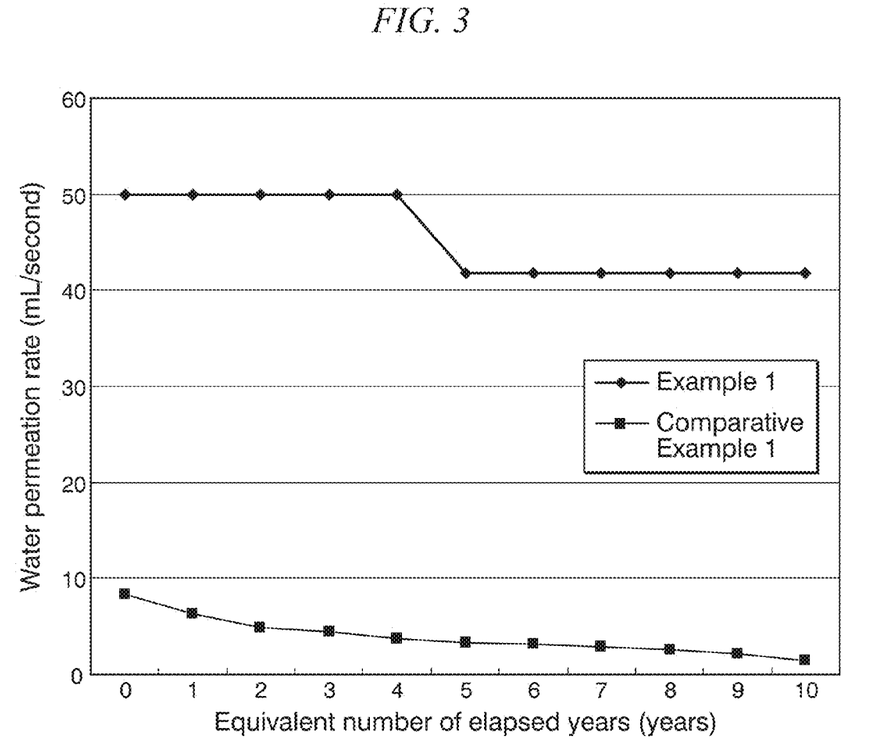
FIG. 3 is a graph illustrating the changes in water permeation rate in an Example 1 and a Comparative Example 1.

FIG. 3 is a graph illustrating the changes in water permeation rate in Example 1 and Comparative Example 1, wherein the water permeation rate is shown along the vertical axis, and the equivalent number of elapsed years is shown along the horizontal axis.

As illustrated in Table 1 and FIG. 3, Example 1 which applied the present invention exhibited a faster water permeation rate than Comparative example 1 in which no grinding was performed, from the initial measurement right through to the equivalent of 10 years elapsed.

In addition, whereas in Example 1 the water permeation rate after the equivalent of 10 years elapsed was 83.4% of the initial water permeation rate, in Comparative Example 1, the water permeation rate after the equivalent of 10 years elapsed was only 18.1% of the initial water permeation rate.

Based on the above results it was evident that with the porous ceramic that applied the present invention, any decrease in water permeability could be suppressed over a long period of time.

INDUSTRIAL APPLICABILITY

According to the porous ceramic of the present invention, any decrease in water permeability can be suppressed over a long period of time, and therefore the invention is extremely useful industrially.

DESCRIPTION OF THE REFERENCE SIGNS

1: Porous ceramic

The invention claimed is:

1. A porous ceramic composed of a porous ceramic sintered body produced by molding and sintering a mixture comprising a clay, wherein either one or both surface portion in the thickness direction of the porous ceramic sintered body has been removed by grinding,
　　wherein pores formed in the porous ceramic are continuous pores that are mutually interconnected,
　　wherein the degree of grinding is a depth of 0.5 to 5 mm from the fired surface of the porous ceramic sintered body,
　　wherein the mixture comprises a foaming agent, and
　　wherein the foaming agent is a slag with a blend amount from 10 to 80% by mass.

2. A method for producing a porous ceramic, comprising molding and sintering a mixture comprising a clay to obtain a porous ceramic sintered body, and subjecting a surface of the porous ceramic sintered body to grinding,
　　wherein pores formed in the porous ceramic are continuous pores that are mutually interconnected,
　　wherein the degree of grinding is a depth of 0.5 to 5 mm from the fired surface of the porous ceramic sintered body,
　　wherein the mixture comprises a foaming agent, and
　　wherein the foaming agent is a slag with a blend amount from 10 to 80% by mass.

3. The porous ceramic according to claim 1, wherein the percentage volume of the pores within the porous ceramic (porosity) is determined in accordance with the porosity represented by [(volume of pores)/(volume of porous ceramic)]× 100 is from 20 to 85% by volume.

4. The porous ceramic according to claim 1, wherein the water permeation rate after the equivalent of 10 years or less elapsed was at least 83.4% of the initial water permeation rate.

5. The porous ceramic according to claim 1, wherein the pores are millimeter order pores having a pore size exceeding 1 mm but not more than 300 mm.

\* \* \* \* \*